No. 691,325. Patented Jan. 14, 1902.
H. G. SAMMONS.
TOY.
(Application filed Oct. 4, 1901.)
(No Model.)
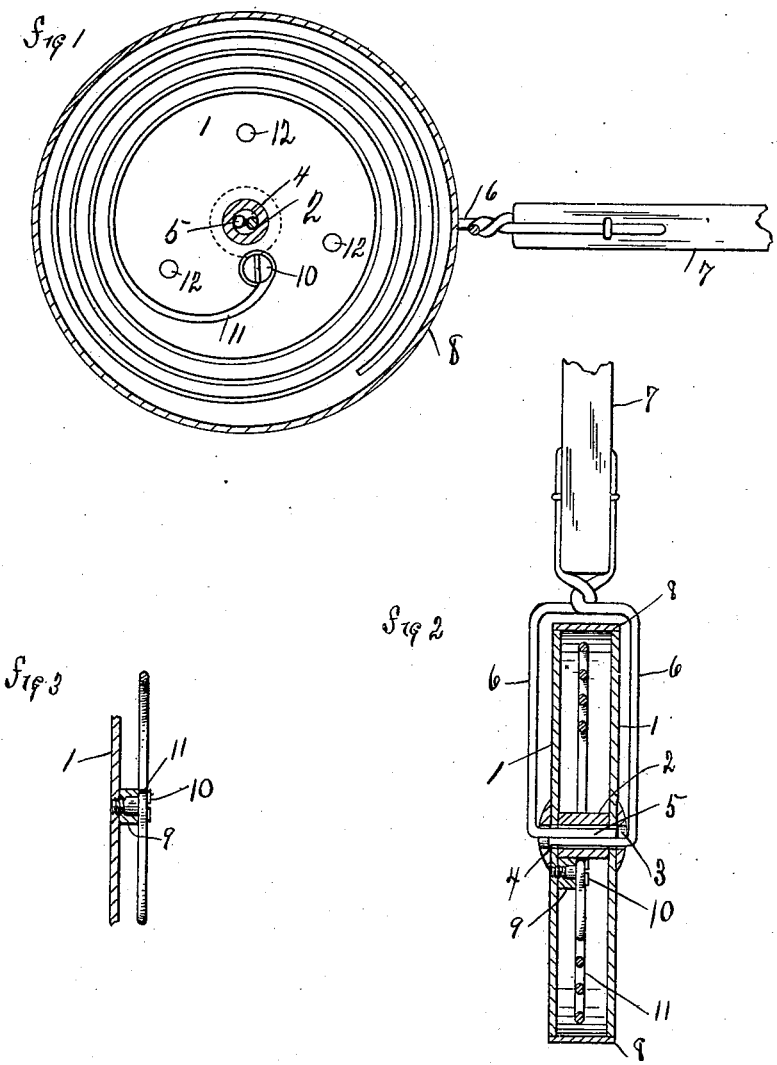

UNITED STATES PATENT OFFICE.

HUGH G. SAMMONS, OF CANTON, OHIO, ASSIGNOR OF ONE-HALF TO THOMAS H. ST. JOHN, OF CANTON, OHIO.

TOY.

SPECIFICATION forming part of Letters Patent No. 691,325, dated January 14, 1902.

Application filed October 4, 1901. Serial No. 77,568. (No model.)

*To all whom it may concern:*

Be it known that I, HUGH G. SAMMONS, a citizen of the United States, residing at Canton, in the county of Stark and State of Ohio, have invented certain new and useful Improvements in Toys; and I do hereby declare that the following is a full, clear, and exact description of the same, reference being had to the annexed drawings, making a part of this specification, and to the figures of reference marked thereon, in which—

Figure 1 is a sectional view of the periphery of the casing, showing the spring located therein and illustrating a portion of the handle. Fig. 2 is a transverse section through the diameter of the casing. Fig. 3 is a view showing a portion of the sides and illustrating the spring properly connected.

The present invention has relation to toys; and it consists in the peculiar construction hereinafter described, and particularly pointed out in the claim.

Similar numerals of reference indicate corresponding parts in all the figures of the drawings.

In the accompanying drawings, 1 represents the sides, which are disks and may be of any desired diameter, reference being had to the size of the sounding-chamber desired to construct.

Between the side members 1 and at their centers is located the thimble 2, which thimble is provided with an aperture 3, and apertures 4 are formed in the sides 1 and located opposite the aperture 3 in the thimble 2. For the purpose of properly holding the side members and at the same time provide a sufficient wearing-surface for the right-angled portions 5, which right-angled portions form a bearing-point for the rotation of the disk sides 1. From the right-angled portions 5 extend the members 6, which members are twisted together and extended along the sides of the handle 7, which handle is formed of such a length that the sounding-chamber disk proper can be rolled upon the floor or ground, it being understood that the two side disks 1 are to be connected by suitable bands, such as 8, which may be connected to the peripheries of the disks 1 in any convenient and well-known manner.

To the inner side of one of the disks 1 is connected the short post 9, in which short post is located the screw 10, said screw being seated into one of the side members 1. The screw 10 is for the purpose of holding the connected end of the spring 11, which spring is provided with any desired number of convolutions and the outer convolution terminating at a point a short distance from the inner periphery of the band 8.

It will be understood that by the rotation of the disk proper and by the oscillations or tilting of the hollow disks and also by the swinging movement of the convolutions of the spring they will strike the sides 1, and thereby impart a musical sound within the chamber.

In use the hollow disk is rolled in substantially the same manner that a hoop is rolled, except that it is held in place with reference to its handle.

For the purpose of admitting the sound to escape from the hollow disk the side members 1 are each provided with any desired number of apertures, such as 12. These may be arranged as desired.

Having fully described my invention, what I claim as new, and desire to secure by Letters Patent, is—

In a toy the combination of a cylinder consisting of disks spaced one from the other, and a band connected to the peripheries of the spaced disks, a thimble located between the spaced disks and the spaced disks connected to the opposite ends of the thimble, a handle having connected thereto twisted members, and the twisted members provided with right-angled portions spaced one from the other, and the right-angled portions located in the aperture of the thimble, and a spring or gong secured to a post fixed to one of the spaced disks, substantially as and for the purpose specified.

In testimony that I claim the above I have hereunto subscribed my name in the presence of two witnesses.

HUGH G. SAMMONS.

Witnesses:
F. W. BOND,
J. R. BOND.